June 17, 1952  A. J. GROSS  2,600,758

AUTOMATIC LOCK FOR TRAILER VACUUM BRAKES

Filed Nov. 17, 1948

INVENTOR.
Adolph J. Gross
BY
Zabel and Gritzbaugh
Attorneys

Patented June 17, 1952

2,600,758

UNITED STATES PATENT OFFICE 2,600,758

AUTOMATIC LOCK FOR TRAILER VACUUM BRAKES

Adolph J. Gross, Chicago, Ill.

Application November 17, 1948, Serial No. 60,583

1 Claim. (Cl. 188—265)

This invention relates to a brake lock that takes the form of an accessory attachment adapted to be used with the conventional brake systems found on various vehicles such as the detachable trailers of truck-trailer units.

The truck-trailer or other vehicle units to which my invention may be applied ordinarily have a vacuum type system that controls the mechanical operation of the brake shoes in relation to the brake drums. This system, in the usual case, depends for operation upon the use of vacuum, or more specifically, the use of two cooperating vacuums, each of which is derived from the motor in the truck of the truck-trailer unit.

The communicating pipes or conduits that conduct the vacuum generated in the motor of the truck to the point of application at the brake controls of the trailer are herein termed "lines." Thus, two lines are present, each with a suitable coupling means at a convenient point so that separation is possible when the trailer is disconnected from the truck, as it often is for loading, unloading, or storage.

As mentioned, the controls for the brakes provided on the trailer vehicle depend for their operation upon the existence and maintenance of a condition of vacuum in the vacuum lines. Accordingly, when a trailer is disconnected from its associated truck, whether or not its brakes remain in applied condition depends entirely upon the maintenance of a vacuum in its brake control system. In practice, it has been found that the brake control systems are not in fact perfectly air tight, and, as a result, the vacuum is lost, sometimes after a comparatively long period, and sometimes very quickly after the trailer has been disconnected. After the vacuum has been lost, the brakes relax, and do not thereafter effectively act to prevent unwanted movement of the trailer. Consequently, it has become common practice to place blocks on both sides of the various wheels of the trailer.

The object of the present invention is to provide a small, simple, inexpensive and highly satisfactory attachment that may be applied to the braking system of a conventional trailer or other vehicle equipped with a vacuum brake control system, and which will, at the time the trailer is uncoupled from its associated truck, automatically effect a mechanical locking of the trailer brakes. This mechanical locking of the trailer brakes is entirely independent of the vacuum that otherwise is relied upon to maintain the brakes in applied condition. In other words, if the vacuum should escape or decrease in value for one reason or another, the mechanical lock of my invention is present to maintain the brakes in applied condition for an unlimited period of time.

With my invention, therefore, the immobility of an uncoupled trailer no longer depends upon the thoughtfulness of the truck driver to place blocks in adequate number and size in front of and behind the wheels of the trailer. My invention is automatic and secure in its operation, and it functions at the instant the vacuum lines to the trailer are uncoupled when the trailer is disconnected from the truck.

Other objects and advantages of my invention will be apparent as the description proceeds, reference being had to the accompanying drawing wherein one form of the invention is shown. It is to be understood that the description and drawing are illustrative only, and are not to be taken as limiting the invention except insofar as it is limited by the claim.

Figure 1:
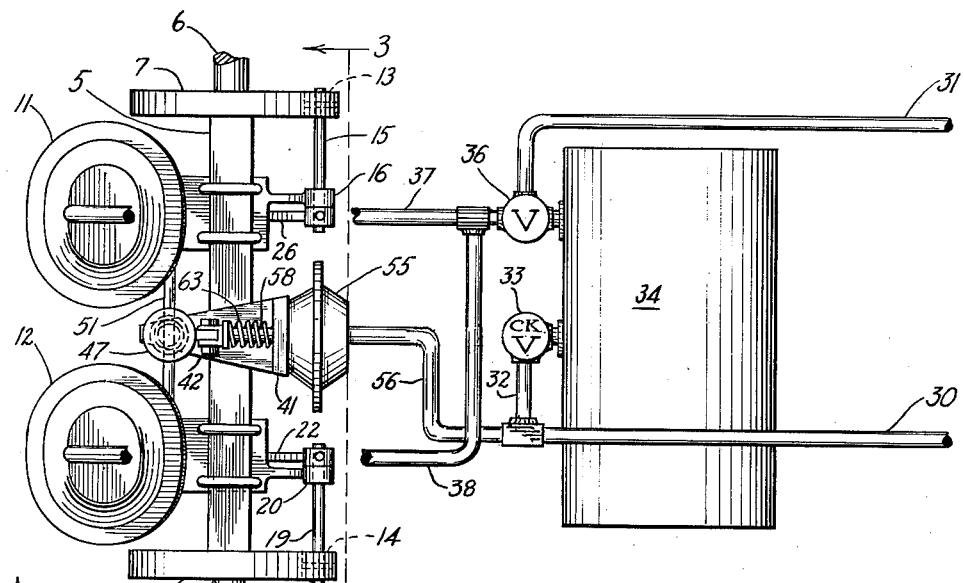
Fig. 1 is a top view of a conventional vacuum type brake control system and associated brake shoes showing my invention applied thereto.

To facilitate explanation of my invention, it is considered desirable first to describe briefly the conventional vacuum type brake control system with which my invention is normally used. Only one set of brakes, i. e. those associated with a single pair of opposing wheels, and a single control system, are shown in the drawing, although it is apparent that duplication is possible with other sets of opposing wheels if desired.

A wheel carrying axle of a vehicle is shown at 5, the illustrated axle being for the most part rectangular in cross section. The axle ends 6 are machined to a circular cross section for the reception of wheels and wheel bearings (not shown).

Brake shoes 7 and 8 (Figs. 1 and 3) are mounted for operation near the ends of axle 5, the respective shoes cooperating in the usual manner with brake drums (not shown) carried by the vehicle wheels. Brake shoe 8 has been removed in Fig. 2 for clarity. Power chambers 11 and 12 (Fig. 1) are mounted on axle 5 adjacent brake shoes 7 and 8 respectively. As will be presently seen, each power chamber exercises control over operation of its respective, adjacent brake shoe.

Figures 2, 3:
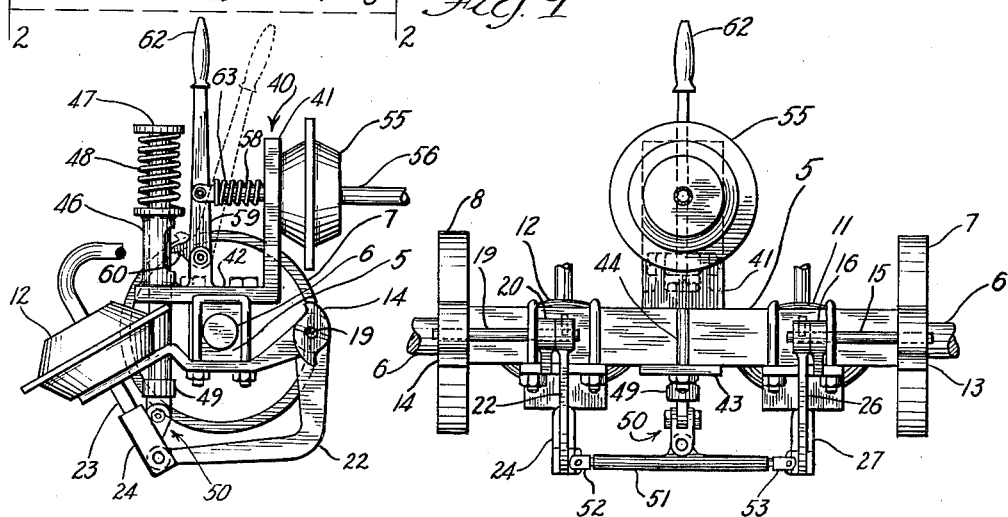
Fig. 2 is a partly broken away view taken on line 2—2 of Fig. 1.
Fig. 3 is a view taken on line 3—3 of Fig. 1.

Brake shoes 7 and 8 expand under the influence of cams 13 and 14, the shape of cam 14 being best shown in Fig. 2. In this figure, the cam is shown in its brake applied position, i. e. the associated brake shoe, if it were shown, would be expanded to a maximum degree by the cam. Brake shoe 7, in Fig. 2, is correspondingly expanded.

Cam 13 is carried by and rotates with a shaft 15 (Figs. 1 and 3) that is journalled in a bearing 16 extending from axle 5. Similarly, cam 14 has a shaft 19 and associated bearing 20. Cam 14 (Fig. 2) is actuated by means of an L-shaped arm 22 that forms a connecting link between shaft 19 and a connecting rod 23 extending from power chamber 12. A clevis 24 at the end of connecting rod 23 forms a pivotal connection between rod 23 and the L-shaped arm 22, as best shown in Figs. 2 and 3. Similarly, shaft 15 has an L-shaped arm 26 that connects through clevis 27 to the connecting rod of power chamber 11 for actuation of cam 13.

Two lines 30 and 31 (Fig. 1) extend from the truck motor to a point in the vehicle adjacent the above described brake control apparatus. Each line has a coupling (not shown) so that the lines may be broken when the trailer is disconnected from the truck. During operation of the truck motor, a condition of vacuum normally exists in both lines.

Line 30, commonly called the "live line," communicates through short line 32 and check valve 33 with reservoir tank 34. A substantial vacuum is maintained at all times during truck operation in tank 34 by virtue of this connection with line 30. In fact, under idealized conditions the same degree of vacuum is supposed to be maintained in tank 34 also when the trailer is separated from the truck, and parked for an extended period of time. However, due to failure to achieve or maintain idealized conditions, the vacuum in tank 34 decreases with time when the trailer is separated from the truck, that is, when live line 30 is not continually providing vacuum. Check valve 33, of course, is provided to prevent escape of vacuum through lines 30 and 32 when the coupling is broken.

Line 31 is called the "control line," and it leads to a control valve 36. The valve 36 is disposed between tank 34 and a pair of diverging lines 37 and 38 that lead respectively to power chambers 11 and 12. As stated, a vacuum is normally maintained in control line 31, this vacuum being effective to maintain control valve 36 in closed condition insofar as communication between tank 34 and lines 37 and 38 is concerned.

When trailer braking action is desired, as is periodically necessary during normal driving, the truck driver actuates the brake pedal or other control in the cab of the truck. This action releases the vacuum from control line 31 which in turn causes valve 36 to open, thus impressing the substantial vacuum contained in tank 34 on the power chambers 11 and 12. This substantial vacuum causes a retraction of the connecting rods extending from the respective power chambers so that they tend to assume the withdrawn position as characterized by the position of rod 23 in Fig. 2. Retraction of the connecting rods causes rotation of the respective L-shaped arms 22 and 26 which in turn rotate shafts 19 and 15 and their associated cams 14 and 13, thus to expand brake shoes 8 and 7 to apply the brakes. When vacuum is again applied to control line 31, as occurs when the truck driver releases the brake pedal, valve 36 closes to remove the substantial vacuum in tank 34 from the power chambers 11 and 12. Thereupon restoring springs (not shown) contact the brake shoes, and extend the connecting rods from the respective power chambers. This restores the control system to a condition for a subsequent braking operation.

The above described vacuum type brake control system forms no part of my invention, but, as stated, it is here set forth to assist in an understanding of my invention which now will be described.

My invention takes the form of an attachment or accessory that may be used in a vehicle having a vacuum type brake control system of the character described. The attachment, in the form illustrated, includes a frame 40 (Fig. 2) having a vertical leg 41 and a horizontal leg 42. Frame 40 is suitably mounted on axle 5 at a point substantially midway between the axle ends. As shown, horizontal leg 42 is seated on the top of axle 5. A plate 43 (Fig. 3) provided with bolts 44, one of which is shown in Fig. 3, may be associated with leg 42 so as to effect a clamping relationship with axle 5.

Leg 42 has an aperture near its free end, and in alignment therewith there is provided a tubular bearing 46 (Fig. 2). A lock rod 47 is journalled for longitudinal (up and down) movement in bearing 46. A spring 48 extends between bearing 46 and lock rod 47 to apply pressure tending to keep slack out of the system, thus to compensate for wear in the various linkages.

The lower end 49 of lock rod 47 is provided with a universal joint 50 (Fig. 3) that connects with a transverse member 51. The member 51 desirably should be constructed so that its length is capable of variation, and to that end the member may have end portions 52 and 53 that are reduced in part to telescope with the member. The portions 52 and 53 are thus able to slide in and out of the ends of member 51, as often is necessary due to unequal conditions in the brake system such as uneven wear of the individual brakes. Also, the distance between power chambers 11 and 12 (with which the ends of member 51 are in vertical alignment) varies among different vehicles. Thus the variable length feature of member 51 makes application of my attachment to various vehicles particularly easy. The portions 52 and 53 also form respective elements of universal joints that have as their other elements the clevises 24 and 27 mentioned previously, the clevises being suitably modified to receive portions 52 and 53.

From the construction of my invention so far described, it will be seen that I have provided a transverse member 51 linking the opposed clevises 24 and 27 of the conventional vacuum type brake control system. These clevises, of course, move to and fro in connection with normal brake operation. In so doing they impart in general a displacement type movement to transverse member 51. Because of uneven brake wear and other factors, the two clevises do not always move in a corresponding manner and amount. Accordingly, the need for universal joints at the ends of transverse member 51, and the variable length feature of the member are apparent.

The displacement movement of member 51 is translated through universal joint 50 into vertical up and down movement of lock rod 47 in bearing 46. Thus, when the brakes are applied, as shown in Fig. 2, rod 47 will move to or near its upper limit of movement. Conversely, when the brakes are relaxed, rod 47 will move to or near its lower limit of movement. In other words, rod 47 fluctuates up and down in response to brake operation.

An auxiliary power chamber 55 is mounted on leg 41 of frame 40. This power chamber is connected by means of line 56 to live line 30, as best shown in Fig. 1. Auxiliary power chamber 55 is of a well known type such as that shown in U. S. Patent No. 2,127,890. The chamber there referred to comprises diaphragm casing 5, diaphragm 7, vacuum chamber 8, rod 9 and coil spring 13, the mentioned reference numerals being those applied to Fig. 1 of the drawing forming a part of the said patent.

Power chamber 55 is provided with means for automatically engaging lock rod 47 to maintain the rod in a predetermined position, normally the position shown in Fig. 2 where the brakes are in applied condition. The means here shown includes arm 58, member 59 pivoted to leg 42, and spur 60, all clearly shown in Fig. 2.

Tubular bearing 46 contains a longitudinal opening to provide access of spur 60 to lock rod 47 so that spur 60 may physically engage the rod.

The location of the pivot for member 59 is so chosen that spur 60 normally extends toward lock rod 47 on a bias. This arrangement provides a cam action so that upon engagement of spur 60 with lock rod 47, the tendency of the rod to move in a downward direction tightens the force of engagement between the spur and the rod, thus effectively preventing rod movement in the downward direction. Conversely, tendency of the rod to move upwardly relaxes the pressure of engagement and permits upward motion.

For convenience, member 59 may have an extension providing a handle 62, the handle being useful for relaxing the brake lock when the trailer is to be moved without first being coupled to a vacuum system, as when the trailer is moved manually, for example.

A spring 63 surrounds arm 58 between leg 41 and the point of connection between the arm and member 59, the spring tending to move the arm so as to rotate member 59 and its associated spur counter-clockwise from the dotted line position to the full line position shown in Fig. 2. Spring 63, therefore, provides the force that effects initial engagement between spur 60 and lock rod 47, additional force, if necessary, being provided by the tendency of rod 47 to move downwardly as the vacuum in the main vacuum system decreases.

As mentioned, auxiliary power chamber 55 of my attachment is connected by line 56 to the live line 30 extending from the truck motor. During the time the truck and trailer are connected together and in operation, the vacuum in live line 30 is impressed upon power chamber 55. Under this condition, arm 58 is in its retracted (right hand in Figs. 1 and 2) position, and member 59 and spur 60 are in the dotted line positions (Fig. 2). In other words, auxiliary power chamber 55 holds arm 58 against the force of spring 63.

When the trailer is disconnected from its associated truck, the lines 31 and 30 are, of course, uncoupled. It is immaterial to the effective operation of my invention as to which line is uncoupled first. If line 31 is uncoupled first, the release of vacuum therein causes the brakes to be applied. After the brakes are applied, the various elements in the brake control system assume the positions shown in Fig. 2, with lock rod 47 of my attachment in its upper position. Thereafter, live line 30 is uncoupled to release the vacuum from auxiliary power chamber 55. Spring 63 then functions to move arm 58 to the left, as shown in Fig. 2, and to rotate member 59 on its pivot. This causes spur 60 to engage lock rod 47 to prevent downward motion of the rod. Since rod 47 is connected by the various linkages above described to the brake cams 13 and 14, the cams are maintained in their brake-applied positions. Under these circumstances, the inevitable escape of vacuum from tank 34 does not adversely affect the applied condition of the brakes.

If live line 30 happens to be uncoupled first, my attachment is actuated so that spur 60 engages back rod 47, thus preventing downward motion of the rod. However, due to the biased spur arrangement, rod 47 is free to move upwardly. Consequently, when control line 31 is later uncoupled, and the main control system functions to apply the brakes, lock rod 47 moves upwardly with the brake applying action. The rod is then retained against downward motion by spur 60, and the brakes indefinitely remain in applied condition.

When the trailer is again connected to the truck and the lines 30 and 31 are coupled, vacuum is applied to auxiliary power chamber 55 to draw arm 58 to the right. This automatically releases the connection between spur 60 and lock rod 47, and permits the rod to move freely in accordance with the braking action occasioned by normal driving.

From the above description it is thought that the construction and advantages of my invention will be readily apparent to those skilled in the art. Various changes and modifications may be made without departing from the spirit or losing the advantages of the invention.

Having thus described the invention, what I claim as new and desire to secure by Letters Patent is:

A unitary brake lock accessory comprising a frame, a vacuum operated auxiliary power chamber mounted on said frame, said power chamber having a connecting arm, a tubular member mounted on said frame and spaced from said chamber, a lock rod journalled in said tubular member for longitudinal movement, a variable length transverse member having rotatable telescoping ends, a universal joint means connecting the midpoint of said transverse member to one end of said lock rod, a universal joint means, including a rotatable telescoping end, at each end of said transverse member, a lever member pivoted at one end to said frame and disposed between said power chamber and said tubular member, the connecting arm of said power chamber being pivotally attached to said lever member at a point spaced from the pivoted end of said lever member, a spring tending to extend the connecting arm with respect to said chamber, and a cam spur on said lever member between the pivoted end of said lever member and the point of attachment of said connecting arm, said cam spur engaging said lock rod to prevent longitudinal movement thereof in brake releasing direction when said spring extends said connecting arm following release of vacuum in said power chamber, said cam spur being inclined with respect to said lock rod in a direction to tighten the engagement with said lock rod as the latter tends to move in brake releasing direction.

ADOLPH J. GROSS.

REFERENCES CITED

The following references are of record in the file of this patent:

UNITED STATES PATENTS

| Number | Name | Date |
| --- | --- | --- |
| 572,553 | Marble | Dec. 8, 1896 |
| 1,315,454 | Baker | Sept. 9, 1919 |
| 1,363,607 | Lovejoy | Dec. 28, 1920 |
| 1,678,949 | Moser | July 31, 1928 |
| 2,055,835 | Bond | Sept. 29, 1936 |
| 2,076,532 | Francoeur | Apr. 13, 1937 |
| 2,099,453 | Searle | Nov. 16, 1937 |
| 2,121,366 | Robinson | June 21, 1938 |
| 2,127,890 | Sills | Aug. 23, 1938 |
| 2,243,656 | Shannon | May 27, 1941 |
| 2,314,444 | Crittenden | Mar. 23, 1943 |
| 2,327,344 | Forker | Aug. 24, 1943 |